Feb. 25, 1964    J. R. BARR ET AL    3,122,017
ELECTRICAL APPARATUS HAVING MEANS FOR INDICATING LIQUID LEVEL
Filed Dec. 29, 1960                                2 Sheets-Sheet 2
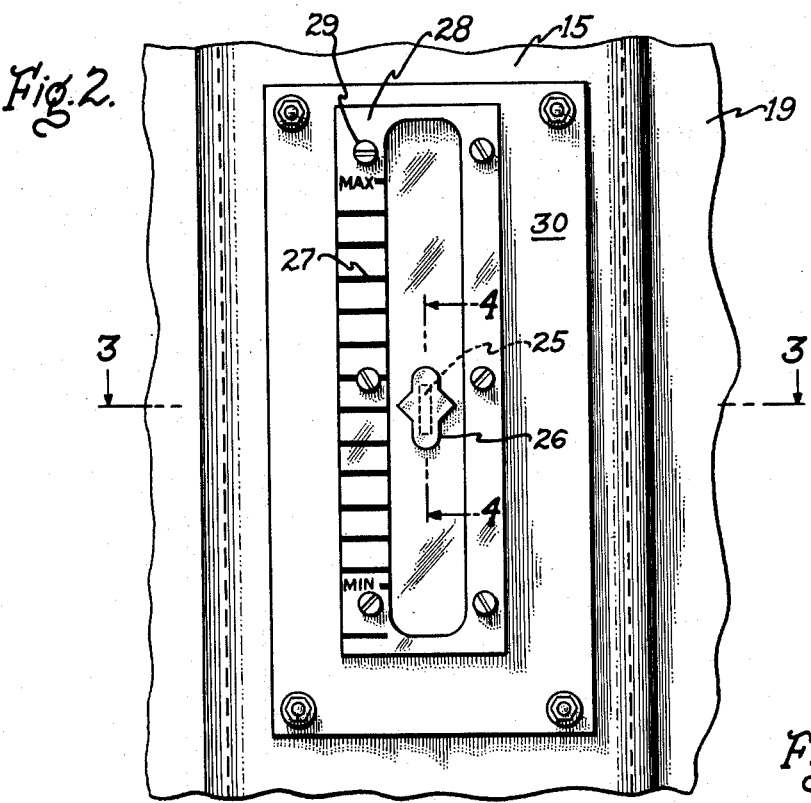
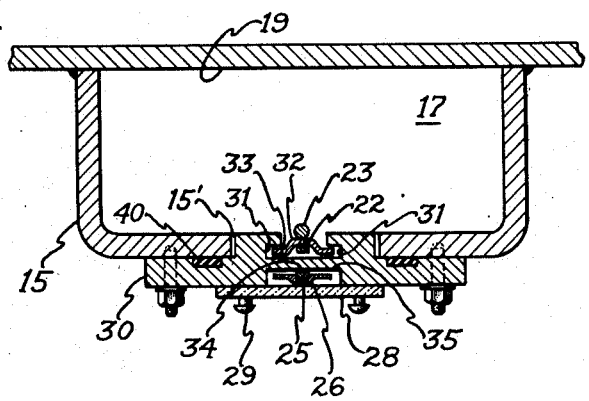
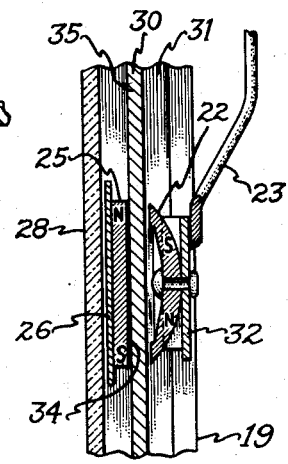
Inventors,
James R. Barr,
Robert L. Comer,
by
Their Attorney.

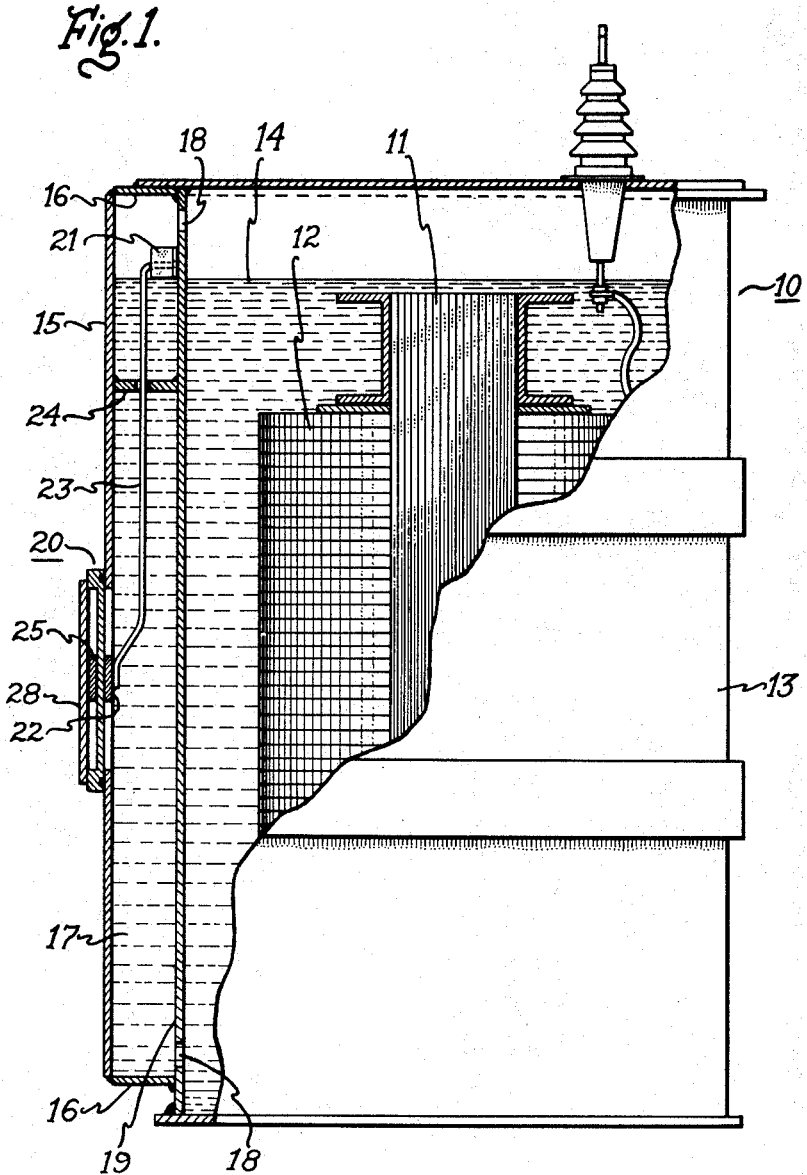

United States Patent Office 3,122,017
Patented Feb. 25, 1964

3,122,017
ELECTRICAL APPARATUS HAVING MEANS FOR INDICATING LIQUID LEVEL
James R. Barr and Robert L. Comer, Rome, Ga., assignors to General Electric Company, a corporation of New York
Filed Dec. 29, 1960, Ser. No. 79,264
2 Claims. (Cl. 73—322)

This invention relates to liquid level indicators, and to structures to which such indicators may be applied.

It is well known in the indicator art to employ a float connected to a magnet for actuating a pointer on the outside of a container to indicate the level of a liquid in the container. Such an arrangement possesses the advantage that no opening need be made in the container for means connecting the pointer to the float. However, prior art indicators of the above described type possess several disadvantages. One of the disadvantages arises because of the use of pointers which are pivoted at one end for indicating the level of the liquid. These pivoted pointer structures are relatively delicate, and hence are subject to damage when the indicator and/or the structure to which it is attached is jostled or vibrated. Also they must be calibrated very accurately because the pivoted pointers magnify errors.

Another disadvantage of prior art indicator structures arises when it is desired to indicate the height of liquid at a point an appreciable distance away from the liquid level. For example, in many types of electrical apparatus, such as transformers and the like, in which a current carrying conductor is immersed in a liquid contained in a sealed enclosure, it is usually desirable to have the liquid level indicator located many feet below the upper surface of the liquid. The reason is that such structures are normally quite tall and the liquid level is well above the height of the average man. It is desirable that a person standing on the ground near the apparatus be able to read the level of the liquid inside the apparatus container without having to climb up the apparatus to a height comparable to the level of the liquid. Furthermore, in electrical apparatus of the type described above, it is also desirable to shield the mechanism of the liquid level indicating apparatus from high potential conductors in the apparatus and also to protect the indicating mechanism from sudden turbulence in the liquid, as for example which might be caused by an electrical fault in the apparatus.

Accordingly, it is an object of our invention to provide an improved liquid level indicating mechanism.

Another object is to provide a non-pivoted liquid level indicating mechanism that is economical to produce and structurally rugged.

Another object is to provide a non-pivoted liquid level indicating mechanism that does not magnify errors.

A further object is to provide a liquid level indicator that can be located at a point vertically remote from the level of the liquid being indicated.

A further object is to provide a protective arrangement for mounting a liquid level indicating arrangement in structural reinforcing means on the outside of a container.

A still further object is to provide an enclosure for containing a high potential electrical conductor immersed in a liquid, the container having a liquid level indicator that is shielded from the high potential conductor and protected from damage caused by turbulence in the liquid.

Other objects and advantages of our invention will be apparent from the specification, drawings, and claims, and the scope of the invention will be pointed out in the claims.

Briefly stated, according to one aspect of our invention, an indication of the height of a column of liquid in a passage may be obtained at a point vertically remote from the level of said liquid by employing float means which is connected to vertically extending shaft means. The shaft means may be connected to first magnet means which is slidably mounted adjacent the inside surface of a wall that defines the passage. Second magnet means may be employed on the outside of the passage for providing a visible indication of the liquid level. Both of the magnet means may be magnets, or one may be a magnet and the other a magnetic material attracted by the magnet. The first and second magnet means are aligned adjacent to each other on opposite surfaces of the passage so that they are coupled by magnetic flux. The first magnet means will be caused to move vertically with changes in liquid level because it is connected to the float, and the second magnet means will coincide in movement with the first magnet means because the respective magnet means are coupled by magnetic flux.

When an indicating mechanism of the type described above is employed with electrical apparatus of the type having a high potential conductor immersed in a liquid container in an enclosure, the indicator elements may be protected from high potential fields and also from turbulence of the liquid by locating the float, connecting shaft, and first magnet means in a passage formed by a channel member that is normally employed to structurally strengthen the enclosure. The passage may be defined by the inside of the channel member and the exterior surface of an enclosure wall, and the passage communicates hydraulically with the exterior of the enclosure through openings in the enclosure wall. This will cause the liquid to enter the passage and maintain the same level in the passage as it does within the enclosure.

In the drawing:

FIGURE 1 is a schematic partially cross-sectional view of apparatus employing the teachings of our invention.

FIGURE 2 is an enlarged side elevational view of a portion of the apparatus shown in FIGURE 1.

FIGURE 3 is a cross-sectional view taken along the line 3—3 in FIGURE 2 showing the structure of the parts in greater detail.

FIGURE 4 is a cross-sectional view taken along the line 4—4 in FIGURE 2.

The invention will now be explained by reference to the drawing. In FIGURE 1 an electrical transformer 10 is shown to comprise a magnetic core 11 surrounded in a conventional manner by current carrying conductors forming a winding 12. The core and winding are enclosed in a sealed container 13 and are immersed in a dielectric liquid 14 for the purpose of cooling and electrically insulating the winding and core. The container 13 may be provided with a channel-shaped member 15 for structurally reinforcing the sides thereof so that they will not be deformed or ruptured by pressure or the weight of the liquid 14. The member 15 may be welded along its edges to the outside surface of a wall 19 of the enclosure 13 and may have plates 16 welded to its opposite ends in order to form a hermetically-sealed structure. Thus, a passage 17 will be defined by the interior of the channel-shaped member 15 and the exterior surface of the wall 19; the passage 17 is provided with one or more openings 18 for communicating with the interior of the container 13. This will result in the liquid 14 flowing into the passage 17 and maintaining the same level in the passage 17 as in the container 13.

Referring still to FIG. 1, means 20 may be provided for indicating the level of the liquid 14 within the enclosure 13. A buoyant float 21 may be placed in the passage 17 and connected to first magnet means 22 by shaft means 23. Guide means 24 may be provided in the passage 17 for maintaining the shaft 23 in a desired position. Second magnet means 25 may be placed on the exterior surface of the channel 15 for providing a visible indication of the level of the liquid in the enclosure 13. The first magnet means 22 and the second magnet means 25 may both be magnets, or one of them may be a magnet and the other a small body of material attracted by the magnet.

Referring now to FIGURE 2, where the parts are shown in greater detail, the second magnet means 25 may be attached to pointer means 26 which indicates the level of the liquid 14 on a scale 27. The scale 27 may be imprinted on a member 30 which is made from non-magnetic material, such as non-magnetic stainless steel or plastic. The member 30 may be attached to the channel 15 by nuts and bolts, as illustrated, or by brazing or welding. The pointer 26 may be protected by a removable plate 28 of transparent material that is attached to the member 30 with screws 29.

FIGURES 3 and 4 show a preferred arrangement for slidably mounting the first and second magnet means. The member 30 communicates with the passage 17 through an opening 15' in the channel 15. The opening 15' may be sealed by compressing gasket means 40 between overlapping portions of the member 30 and channel 15 around the opening 15'. The member 30 may be welded to the channel 15 around the opening 15' if it is not desired to removably mount the member 30. A pair of slots 31 are provided on the inside surface of the member 30 within the passage 17. A guide member 32 having wings 33 extending into the slots 31 is attached to the first magnet means 22. The shaft means 23 may be attached to the guide means 32. This structure provides an economical yet rugged arrangement for mounting and guiding the first magnet means 22 for linear movement to coincide with changes in the level of the liquid 14.

The second magnet means 25 has a smooth surface 34 for sliding along the smooth surface of a grooved portion 35 of the member 30 opposite the slots 31. In a preferred embodiment of the invention, the magnet means 22 and 25 are both permanent magnets aligned with each other on opposite surfaces of the member 30, and the ends of the respective magnets at opposite polarities are placed opposite each other, as indicated in FIG. 4. This results in a relatively strong magnetic flux linking the magnets, since the non-magnetic member 30 will not short circuit the flux. Consequently, no other structure is necessary for holding the second magnet means 25 and attached pointer 26 on the surface of the member 30. The flux linking the magnet means must be sufficiently strong so that the movement of the second magnet means 25 will coincide with the movement of the first magnet means 22, and thus the vertical movement of the attached pointer 26 will coincide with the vertical movement of the level of the liquid 14. Although the mounting of the magnet means 22 and 25 on the removable member 30 provides a structure that facilitates obtaining access to the passage 17 for repair or adjustment of the indicator mechanism, it will be appreciated by those skilled in the art that other equivalent arrangements may be employed. For example, when the container is made from non-magnetic material such as aluminum, bronze or plastic, slots 31 and a groove 35 may be provided directly in a wall of the channel 15 without departing from the spirit and scope of the invention.

It has thus been shown that by practicing our invention a rugged yet economical liquid level indicating means may be provided for indicating the height of a liquid at a point that is vertically far below the actual level of the liquid. Thus our liquid level indicating arrangement can be employed on containers in which the liquid level is far above the height of a man, yet the liquid level indicating pointer may be at approximately eye-level. This results in the elimination of the necessity of a person climbing up the container to read a small scale dial adjacent the level of the liquid, or the requirement of employing a very large dial that can be read from many feet below the level of the liquid. Furthermore, when our invention is practiced on electrical apparatus having a high potential current carrying conductor, such as a transformer or the like, sharp corners or other points on the liquid level indicating members that would be subject to electrical stress concentrations in a high potential field are electrically shielded by the wall of the enclosure tank. Furthermore, sudden turbulence in the liquid as for example caused by an electrical fault, is prevented from breaking the parts or jarring them out of position because the liquid column in which the indicator parts are immersed is enclosed in a protected passage.

It will be understood, of course, that while the forms of the invention herein shown and described constitute preferred embodiments of the invention, it is not intended herein to illustrate all of the equivalent forms or ramifications thereof. For example, the indicator parts could be mounted on a wall of a container that does not have reinforcing channel members such as 15. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. Electrical apparatus comprising a high potential conductor immersed in a liquid contained in an enclosure, vertically extending channel means affixed to an outside surface of said enclosure for structurally strengthening same against the weight of said liquid and internal enclosure pressure, the inside of said channel means and the outside surface of said enclosure defining a passage, said enclosure having openings therethrough providing a fluid flow path from the inside of said enclosure to said passage, whereby liquid contained in said enclosure will flow into said passage and maintain the same level as in said enclosure, means for indicating the level of said liquid comprising buoyant means within said passage floating in said liquid, a non-magnetic member removably mounted in an opening in said channel means, a first magnet mounted for a vertical movement in slots extending along the inside surface of said member, shaft means in said passage connecting said buoyant means to said first magnet so that the vertical movement of said first magnet coincides with the movement of said liquid level, a second magnet on the outside of said channel for providing a visible indication of said liquid level, said second magnet having a smooth surface in contact with a smooth portion of a groove in the outside of said member, said first and second magnets being aligned on opposite surfaces of said non-magnetic member and being coupled by magnetic flux so that the movement of said second magnet coincides with that of said first magnet, said channel providing a metal barrier electrically shielding said liquid level indicating means from said high potential conductor and also providing a protected passage preventing turbulence in said liquid from damaging said indicating means.

2. Electrical apparatus comprising a high potential conductor immersed in a liquid contained in an enclosure, vertically extending channel means affixed to the outside surface of said enclosure for structurally strengthening same against the weight of said liquid and internal enclosure pressure, the inside of said channel means and the outside surface of said enclosure defining a passage, said enclosure having openings therethrough providing a fluid flow path from the inside of said enclosure to said passage, whereby liquid contained in said enclosure will flow into said passage and maintain the same level as in said enclosure, means for indicating the level of said liquid comprising buoyant means within said passage floating in said liquid, first magnet means mounted for vertical movement in a slot extending along the inside surface of said channel means, shaft means in said passage connecting said buoyant means to said first magnet means so that the vertical movement of said first magnet means coincides with the movement of said liquid level, second magnet means on the outside of said channel for providing a visible indication of said liquid level, at least one of said magnet means being a permanent magnet, said first and second magnet means being aligned on opposite surfaces of said channel and being coupled by magnetic flux so that the movement of said second magnet means coincides with that of said first magnet means, said channel providing a metal barrier electrically shielding said liquid level indicating means from said high potential conductor and also providing a protected passage preventing turbulence in said liquid from damaging said indicating means.

References Cited in the file of this patent

UNITED STATES PATENTS

| | | |
|---|---|---|
| 436,212 | Chamberlin | Sept. 9, 1890 |
| 530,592 | Kleritj | Dec. 11, 1894 |
| 1,040,127 | Bonesteel | Oct. 1, 1912 |
| 1,858,346 | Straughan | May 17, 1932 |
| 2,233,572 | Atkins | Mar. 4, 1941 |
| 2,310,576 | Dodge | Feb. 9, 1943 |
| 2,554,374 | Melas | May 22, 1951 |
| 2,620,412 | Ford | Dec. 2, 1952 |
| 2,620,661 | Roux | Dec. 9, 1952 |
| 2,728,227 | Eshbaugh | Dec. 27, 1955 |
| 2,850,686 | Macgeorge | Sept. 2, 1958 |

FOREIGN PATENTS

| | | |
|---|---|---|
| 269,782 | Great Britain | Apr. 28, 1927 |
| 450,419 | Great Britain | July 17, 1936 |
| 535,746 | Germany | Oct. 15, 1931 |